Oct. 8, 1968 T. A. BOISSEVAIN ET AL 3,405,405

DISPLACEABLE DISC MAGNETIC STORAGE ASSEMBLY

Filed Aug. 11, 1965

INVENTORS
THOMAS A. BOISSEVAIN
FREDERICK J. DOW
BY Robert S Toperzer
Atty.

United States Patent Office 3,405,405

Patented Oct. 8, 1968

3,405,405

DISPLACEABLE DISC MAGNETIC STORAGE ASSEMBLY

Thomas A. Boissevain, Bedford, and Frederick J. Dow, North Billerica, Mass., assignors to Laboratory for Electronics, Inc., Waltham, Mass., a corporation of Delaware Filed Aug. 11, 1965, Ser. No. 479,364

8 Claims. (Cl. 340—174.1)

ABSTRACT OF THE DISCLOSURE

A disc storage device which makes use of a flexible disc is mounted so that its position can be shifted while it is rotating. In this way, each head for reading and writing on the disc is adapted to cooperate selectively with one of several tracks. The heads are recessed in a stationary backing plate which underlies the disc. To maintain close spacing between the heads and the disc, jets of air impinge upon the disc from above where the heads are located.

Figure 1:
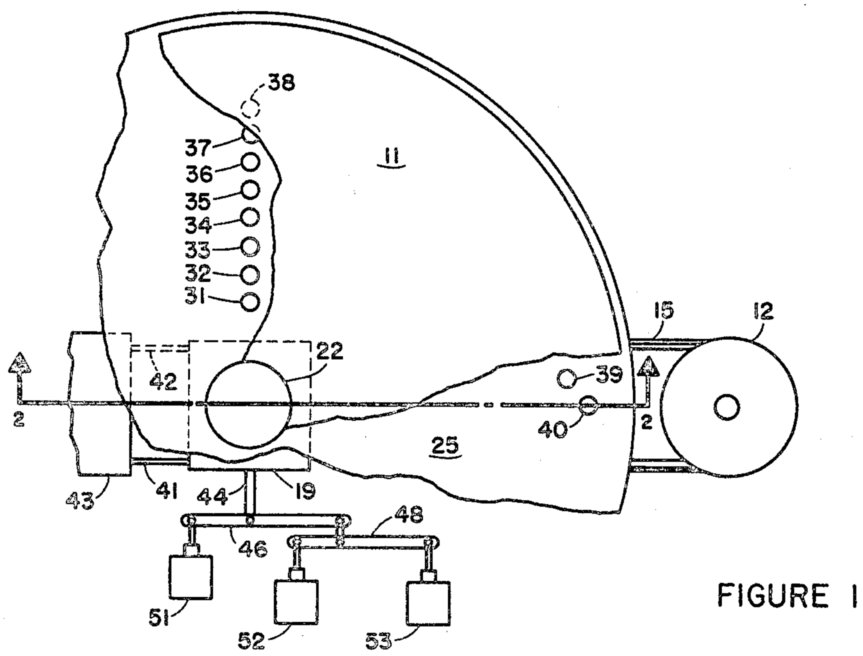

This invention relates to information storage devices and more particularly it is concerned with improvements in flexible magnetic disc type storage devices.

A major problem that has been encountered with flexible magnetic discs is the problem of optimizing the spacing between the disc and the heads which are used for reading and writing, inasmuch as the magnetic resolution and thus the maximum achievable linear bit density is inversely related to the disc spacing. That is to say, unless the bit spacing is reasonably close, leading to a packing density, which is sufficiently high, then of course the device as a whole suffers by comparison with other more conventional types of magnetic storage devices. In the past various solutions to this problem have been attempted with only limited success for the most part.

The present invention solves the problem in an indirect way which avoids many of the pitfalls that have attended a more straightforward attack. The concept contemplated by the present invention leads to a more simplified design whose cost to manufacture is sufficiently low so that many other considerations such as storage capacity and acces time become less significant in the balance. In accordance with the present invention, provisions are made for repositioning of the axis of the disc while it is rotating to the end that each head is adapted to read and write on a plurality of tracks. This greatly reduces the number of heads that are necessary to service the tracks thereby eliminating a large element of the cost. The heads are mounted in a stationary backing plate which is disposed adjacent to the active surface of the disc. The direction of movement of the disc is in a radial line along which the heads are arrayed. Such movement can be accomplished quite rapidly for fast access to any selected track by virtue of the low mass of the disc and its associated mounting asesmbly. For timing purposes, additional heads may be mounted in the backing plate at locations which are spaced angularly by 90° from the information transfer heads. By virtue of their location relative to the direction of movement of the disc, these heads remain in registry with their associated timing tracks within the limits of travel of the disc. For more precise control of the spacing between the heads and the disc, there are provided air nozzles, which act on the disc from above in each region where a head is located.

It is the general object of the present invention therefore to provide a magnetic disc storage device of simplified design and improved utility.

A more specific object is to provide a magnetic disc storage device having indexible tracks.

A still more specific object is to provide a magnetic disc storage device of the above-mentioned character wherein the disc is moved relative to the reading and writing heads.

Another object is to provide more precise control of the spacing relation between the disc and the heads for reading and writing upon the disc. A concomitant object is to provide reasonably large storage capacity without an appreciable increase in access time.

Figure 2:
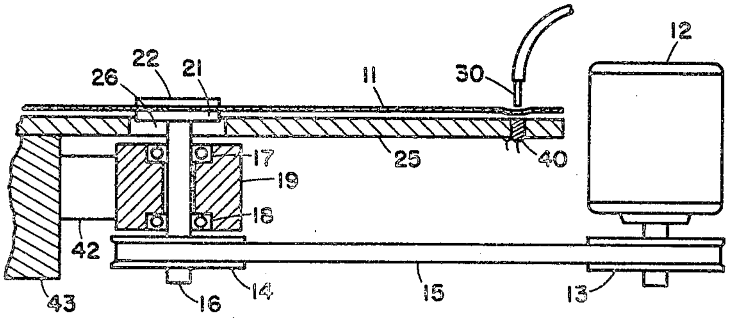

The novel features of the invention together with further objects and advantages will become more readily apparent from the following detailed description and the drawing to which the description refers. In the drawing:

FIG. 1 is a fragmentary plan view of the magnetic disc storage device in accordance with the present invention, the disc having been broken away to show more clearly the reading and writing heads; and FIG. 2 is a sectional view taken on line 2—2 of FIG. 1.

With reference now to the drawings, it will be observed that the numeral 11 refers to the flexible magnetic disc which is driven by a motor 12. By way of example, the disc may be formed from a thin sheet of plastic which has been coated on at least one of its surfaces with iron oxide. A mylar sheet having a thickness of .002" has been found to be suitable for this application. The mechanism for coupling the motor to the disc includes a pair of pulleys 13, 14 and a belt 15. Pulley 13 is the drive pulley mounted on the motor shaft, and pulley 14 is the driven pulley which is mounted on a spindle 16. Spindle 16 is carried in bearings 17 and 18 which in turn are retained in a bearing block 19. A pair of clamping members 21 and 22 serve to make the disc fast to the spindle, clamping member 21 being formed as a flange integral with the upper end of the spindle, and clamping member 22 being fastened by screws to clamping member 21 with the disc 11 in between.

Beneath the disc is a stationary backing plate 25 which has a central aperture 26. Aperture 26 serves to admit air or other environmental fluid into the space between the backing plate and the disc while the disc is rotating and causing air to be expelled radially outwardly from between the disc and the backing plate. The amount of this air flow and its radial distribution has a primary effect upon the rotating profile of the disc and hence its spacing from the backing plate. This phenomena is covered in considerable detail in Patent No. 3,110,889, filed May 2, 1960, in the name of R. E. Morley et al., and issued Nov. 12, 1963. As disclosed in this patent, it may be desirable to control the flow of air through the aperture 26 by means of thermal and pressure sensitive valves but this is not a feature which is material to the principles of the present invention.

Further in accordance with the present invention, there are set into recesses in the backing plate 25 a plurality of heads 31–40 for reading and writing upon the disc. Preferably the upper extremities of these heads are aligned flush with the surface of the backing plate, one such head 40 being shown in elevation in FIG. 2. The remainder of the heads 31 through 39 appear in the plan view of FIG. 1 where heads 37 and 38 are shown in dotted outline to indicate that they are obscured by the uncutaway portion of the disc. It may also be observed from FIG. 1 that heads 31–38 are arrayed parallel and adjacent to a radius of the disc at equally spaced intervals. Heads 39 and 40, on the other hand, are located near the periphery of the disc and are spaced angularly by approximately 90° from the heads 31–38. Above each head on the side of the disc remote from the backing plate there is provided an air nozzle 30 to produce a downward jet of air. The various jets of air associated with the various heads serve to create localized depressions in the profile of the disc so that the undersurface of the disc, that is the side adjacent the backing plate is caused to approach the heads more closely as it passes over them. Only one such nozzle has been shown (FIG. 2) for the purpose of clarity in the drawing.

Finally there is provided a mechanism for displacing the spindle 16 by selected amounts in a direction parallel to the array of heads 31–38. To mount the disc for travel in this direction, a pair of flexible leafs 41 and 42 are connected between bearing block 19 and a stationary support member 43. The plane of each leaf is, as shown, perpendicular to the aforementioned direction of travel. Also coupled to bearing block 19 is an actuating arm 44 (Fig. 1) which is indexable at selected locations corresponding to selected amounts of travel of the spindle. To accomplish this result arm 44 is coupled to an intermediate point on a first lever 46 which has one of its ends coupled to a solenoid 51. The other end of lever 46 is coupled to an intermediate point of a second lever 48. Finally, a pair of solenoids 52 and 53 are coupled to the ends of lever 48.

In operation, before the motor is started, the disc lies limp upon the surface of the backing plate. With the motor operating, so as to produce rotation of the disc at high speed, such as for example, 1000 revolutions per minute for a twenty two inch diameter disc, air is pumped up through the aperture 26 in the backing plate and out from between the peripheral edges of the disc and the backing plate. This air flow is responsible for dynamic fluid forces which affect the rotating disc profile. In addition, internal stresses are created in the disc by the action of centrifugal force and because of the flexible nature of the disc, these stresses are also responsible to a significant degree for the configuration assumed by the disc when it is rotating. The net effect, as described more in detail in the aforementioned patent, is to cause the disc to ride up free of the backing plate and to assume a stable position slightly above the plate. The nominal disc to plate spacing in this stage of the operation is approximately 2 mils (thousandths of an inch), but owing to the fact that precise control of the disc profile is most difficult, this spacing tends to be irregular in the radial direction. This is obviously an undesirable condition from the standpoint of the magnetic recording characteristics exhibited by the overall device and to eliminate this condition, the jets of air produced by the nozzles 30 are brought into play. By means of these jets of air, the disc is depressed in the regions directly above the heads and the extent of such depression in each case is subject to precise control by valving of the flow of air to the nozzles. As a consequence of the localized close separation between the disc and recording heads, magnetic resolution is improved and results in a substantial increase in bit packing density.

A key feature of the device according to the invention which makes it possible to realize these benefits is the provision which is made for multitrack recording by individual heads. This drastically reduces the number of heads that are required to service the various tracks and avoids the need for a staggered arrangement of heads such as that illustrated in the aforementioned patent. With such a staggered arrangement the perturbations produced by the air jets in the region directly above the disc would tend to result in unstable operation. According to the present invention, however, the perturbations produced in the atmosphere directly above the disc are confined to regions in close proximity to the recording heads. Since each such region is relatively remote from any other but its associated recording head, either adjacent to it on the same radial line, or more importantly down stream from it, these localized perturbations are of little consequence as regards stability of operation.

To cause each head to read and write on a number of selected tracks on the disc (eight tracks each in the illustrative embodiment herein), solenoids 51–53 are energized in binary coded fashion to produce selected incremental displacements of the axis of rotation of the disc. For example, if solenoid 53 is energized, the axis of rotation is displaced by one unit which corresponds to the amount of travel required to shift from one track to the next adjacent track. Similarly, two units of displacement are produced by energization of solenoid 52 and four units by solenoid 51.

To produce any other optional amount of displacement in the range of one to seven units, those skilled in the art will recognize that it is necessary merely to energize appropriate combinations of these solenoids.

Another advantage which derives from this mode of track selection is that the amount of relative radial movement between heads 39 and 40 and their associated tracks is insignificant even when the axis of the disc is displaced by the maximum amount. The reason, of course, is that the heads 39, 40 have a 90° angular spacing from the array of heads 31–38 so that movement with respect to them is essentially tangential. This permits the heads 39, 40, which can be used for timing purposes, to stay on track at all times while the other heads are being shifted from one track to another.

Although the present invention has been described in terms of a single preferred embodiment, those skilled in the art will recognize that varous alternative embodiments and modifications which fall within the spirit and scope of the invention are possible. For example, a pneumatic actuating mechanism might be used in place of the solenoids for displacing the disc. Also it should be understood that in actual practice where maximum utilization of the disc surface for information storage is usually of prime importance, a much larger number of heads than the number shown may and usually will be incorporated in the device. In addition, provisions will be made for shifting each head over a considerably greater number of tracks. Therefore the invention should not be deemed to be limited to the details of what has been described herein by way of illustration, but rather it should be deemed to be limited only by the scope of the appended claims.

What is claimed is:

1. Data storage apparatus comprising a flexible magnetic disc, means to rotate the disc, means defining a stationary surface coextensive with one surface of the disc, said means being adapted to admit fluid for controlling the spacing of the disc from said stationary surface, an array of heads mounted in said stationary surface for reading and writing upon the disc, said heads being disposed in alignment parallel to a radius of the disc and cooperating with a corresponding set of tracks on said one surface thereof, and means to displace the axis of rotation of the disc with respect to said array of heads thereby causing said array of heads to cooperate with an alternate set of tracks on said one surface of the disc.

2. Data storage apparatus as claimed in claim 1 including at least one head mounted on said stationary surface with a 90° angular spacing from said array of heads, said one head cooperating continuously with a track on said one surface of the disc when the axis of rotation of the disc is displaced and said array of heads are caused to cooperate with an alternate set of tracks on said one surface of the disc.

3. Data storage apparatus as claimed in claim 1 including at least one jet of fluid acting on a localized area of the other surface of the disc in the vicinity of one of said heads whereby said area of disc is deformed and the spacing between said one head and the track cooperating therewith is correspondingly decreased.

4. Data storage apparatus comprising a flexible magnetic disc, a shaft and a bearing assembly to mount the disc for rotation, means to rotate the disc, means defining a stationary surface coextensive with one surface of the disc, said means being adapted to admit fluid for controlling the spacing of the disc from said stationary surface, an array of heads mounted in said stationary surface for reading and writing upon the disc, said heads being disposed in spaced alignment parallel to a radius of the disc, means to mount said bearing assembly for linear travel in a direction parallel to said radius of the disc, said last named means including a fixed support and a flexible leaf connecting said bearing assembly to said fixed support, an actuating arm connected to said bearing assembly to produce said linear travel thereof, and means to index said arm at a plurality of discrete locations in the line of travel of said bearing assembly thereby causing said array of heads to cooperate selectively with a plurality of sets of tracks on the disc.

5. Data storage apparatus as claimed in claim 4 wherein said last named means includes an arrangement of solenoids and levers.

6. Data storage apparatus as claimed in claim 5 wherein said means to rotate includes a pulley mounted on said shaft and a belt drive operatively connected to said pulley.

7. Data storage apparatus as claimed in claim 6 including at least one head mounted on said stationary surface with a 90° angular spacing from said array of heads, said one head cooperating continuously with a track on said one surface of the disc when the axis of rotation of the disc is displaced and said array of heads are caused to cooperate with an alternate set of tracks on said one surface of the disc.

8. Data storage apparatus comprising a flexible magnetic disc, means to rotate the disc, means defining a stationary surface coextensive with one surface of the disc, said means being adapted to admit fluid for controlling the spacing of the disc from said stationary surface, at least one head defining a track on said one surface of the disc, said head being mounted in said stationary surface for reading and writing upon said track, pressure fluid means to produce a localized depression in the other surface of said disc in the vicinity of said head thereby to decrease the spacing between said head and said track, and means to displace the axis of rotation of the disc with respect to said head thereby causing said head to cooperate with another track on said one surface of the disc.

References Cited

UNITED STATES PATENTS

| | | | |
|---|---|---|---|
| 3,178,719 | 4/1965 | Shapiro | 340—174.1 |
| 2,862,389 | 12/1958 | Potter | 340—174.1 |

BERNARD KONICK, *Primary Examiner.*

A. I. NEUSTADT, *Assistant Examiner.*